(12) United States Patent
Wood

(10) Patent No.: US 7,433,672 B2
(45) Date of Patent: Oct. 7, 2008

(54) APPARATUS AND SYSTEM FOR EMERGENCY RECORDING AND NOTIFICATION AND ASSOCIATED METHOD

(75) Inventor: Joseph Stuart Wood, Andover, MA (US)

(73) Assignee: Nokia Corporation, Espoo (FI)

(*) Notice: Subject to any disclaimer, the term of this patent is extended or adjusted under 35 U.S.C. 154(b) by 240 days.

(21) Appl. No.: 10/880,188

(22) Filed: Jun. 29, 2004

(65) Prior Publication Data

US 2005/0287980 A1 Dec. 29, 2005

(51) Int. Cl.
*H04B 1/46* (2006.01)
*H04M 3/42* (2006.01)

(52) U.S. Cl. .................. 455/404.1; 455/414.1

(58) Field of Classification Search .......... 455/404.1, 455/414.1, 456.2, 566, 557, 550, 521, 575, 455/90, 73, 450.2, 567, 550.1, 80
See application file for complete search history.

(56) References Cited

U.S. PATENT DOCUMENTS

| 4,920,556 | A | * | 4/1990 | Wong ................... 379/51 |
| 5,519,760 | A | | 5/1996 | Borkowski et al. |
| 5,710,803 | A | | 1/1998 | Kowal et al. |
| 5,719,936 | A | | 2/1998 | Hillen |
| 5,893,037 | A | | 4/1999 | Reele et al. |
| 5,966,643 | A | | 10/1999 | Radley |
| 6,044,257 | A | | 3/2000 | Boling et al. |
| 6,137,525 | A | * | 10/2000 | Lee et al. ............. 348/14.02 |
| 6,169,902 | B1 | | 1/2001 | Kawamoto |
| 6,181,954 | B1 | * | 1/2001 | Monroe et al. .......... 455/557 |
| 6,219,560 | B1 | * | 4/2001 | Erkkila et al. ........... 455/557 |
| 6,278,884 | B1 | * | 8/2001 | Kim .................... 455/556.1 |
| 6,288,641 | B1 | | 9/2001 | Casais |
| 6,553,238 | B1 | | 4/2003 | Ginzel et al. |
| 6,567,502 | B2 | | 5/2003 | Zellner et al. |
| 6,580,904 | B2 | | 6/2003 | Cox et al. |
| 6,636,732 | B1 | | 10/2003 | Boling et al. |
| 6,748,223 | B2 | | 6/2004 | Fraccaroli |
| 2002/0137528 | A1 | | 9/2002 | Fraccaroli |

FOREIGN PATENT DOCUMENTS

| SK | 3974 U | 11/2004 |
| WO | WO 97/41686 | 11/1997 |
| WO | WO 99/57910 | 11/1999 |
| WO | WO 01/20567 | 3/2001 |
| WO | WO 01/31925 | 5/2001 |
| WO | WO 01/93590 | 12/2001 |

* cited by examiner

*Primary Examiner*—Melody Mehrpour
(74) *Attorney, Agent, or Firm*—Alston & Bird LLP

(57) ABSTRACT

An apparatus and system for communicating an emergency and an associated method are provided. In one embodiment of the present invention, the apparatus is a mobile terminal including an input mechanism that is capable of receiving user input indicative of an emergency, and a wireless transmitter capable of transmitting an emergency message. The mobile terminal further includes a recording device capable of recording at least one of audio and imagery information indicative of the emergency, and a memory capable of storing the audio and imagery information. The audio and imagery information are also capable of being transmitted by the wireless transmitter.

43 Claims, 5 Drawing Sheets

APPARATUS AND SYSTEM FOR EMERGENCY RECORDING AND NOTIFICATION AND ASSOCIATED METHOD

BACKGROUND OF THE INVENTION

1) Field of the Invention

The present invention relates to mobile terminals and, more particularly, to emergency recording and notification for mobile terminals, as well as an associated method.

2) Description of Related Art

Emergencies can arise in any number of locations and at unexpected times. Therefore, devices have been developed that may be used in emergency situations where the user has network access and is able to place a call for help, such as through 911 or a similar service. Instead of dialing 911 or similar emergency number, some phones have the capability to program the number into the phone so that the number is on "speed dial." Having an emergency number on speed dial enables a user to transmit the call for assistance by quickly depressing a designated speed dial button, which avoids confusion or misdialing the number. However, some phones provide a single button for signaling an emergency that is externally exposed. This one button may be inadvertently depressed, thereby potentially leading to false alarms.

Other devices used solely for emergency purposes have been developed. For example, U.S. Pat. No. 6,636,732 to Boling et al. discloses an emergency phone with a single-button activation. The phone is used for emergency purposes only and includes a single activation button that is covered by a flip top cover and is able to signal an emergency response center. Once the phone is activated, a microprocessor automatically scans for an available cellular channel, retrieves a preprogrammed emergency telephone number, and places the cellular call to the emergency center. The phone includes a speaker and microphone that enable the operator of the phone to communicate with personnel located at the emergency response center. The phone is strictly limited to emergency use to simplify the device and to minimize the cellular costs to support the service. The emergency phone is also capable of activating a home security system, a car alarm, and/or an audible or visual alarm on the phone, and providing a location of the phone. As will be apparent, however, it would generally be more advantageous to provide a fully functional mobile terminal, such as a mobile phone, that is user friendly and minimizes false alarms.

Sometimes, it is inconvenient for a user to place a call for help with their mobile phone or otherwise bring attention to themselves, such as in situations where the user is unable to talk, or is afraid to talk, given the perceived danger of the particular situation. In addition, there are instances where the mobile phone is incapable of obtaining network access, which prevents a user from sending an emergency message.

Even if the user can transmit an emergency message, the mobile phone can only provide limited information, such as the location of the phone. Since the success of responding to the emergency message depends in part upon the quantity and quality of the information that is provided, it would be desirable to provide additional information in conjunction with the emergency message.

BRIEF SUMMARY OF THE INVENTION

The invention addresses the above needs and achieves other advantages by providing a mobile terminal that may transmit an emergency message and information indicative of the emergency to a service center either discretely or non-discretely as the situation dictates. The mobile terminal includes an input mechanism that enables a user to quickly activate a wireless transmitter, while also reducing the potential for false alarms. In addition, the mobile terminal may record audio, imagery, and positional information irrespective of whether a signal is present and then transmit the information to a service center once a signal is received, thus preserving information potentially beneficial for the service center.

In one embodiment, a mobile terminal for communicating an emergency is provided. The mobile terminal includes an input mechanism that is capable of receiving user input indicative of an emergency, such as two buttons positioned on opposed lateral sides of the mobile terminal. The mobile terminal also includes a wireless transmitter capable of transmitting an emergency message in response to the user input, and in one embodiment of the present invention, the emergency message includes at least one of a time of activation, a location of the mobile terminal, and imagery indicative of the emergency. The mobile terminal further includes a recording device capable of recording at least one of audio and imagery information indicative of the emergency and in response to the user input, and a memory capable of storing the audio and imagery information. The audio and imagery information are also capable of being transmitted by the wireless transmitter.

In various aspects of the present invention, the recording device is capable of recording at least one of audio, photographic, video, and global positioning system information. Also, the memory is capable of storing a plurality of codes that are capable of being entered to activate and deactivate the cellular transmitter. For example, the plurality of codes comprises a first code that is capable of deactivating the cellular transmitter, and a second code that is capable of activating the cellular transmitter to transmit an alarm message. The recording device of the mobile terminal is advantageously capable of recording the audio and imagery information in increments of time while the transmitter is incapable of transmitting the audio and imagery information. The wireless transmitter is capable of transmitting the audio and imagery information in different increments of time than that in which the audio and imagery information is recorded while the transmitter is incapable of transmitting the audio and imagery information. The mobile terminal may further include a display capable of displaying an icon indicating that the wireless transmitter has been activated, and a tactile feedback mechanism capable of indicating to a user that the wireless transmitter has been activated. Further, the mobile terminal may include a memory capable of storing the audio and imagery information and storing a plurality of codes, where the plurality of codes are capable of being entered to activate and deactivate the wireless transmitter.

The present invention can also be embodied in a system for communicating an emergency. The system includes a mobile terminal as described above and a service center comprising a wireless receiver capable of communicating with the wireless transmitter of the mobile terminal. In variations of the system, the service center is capable of both activating and deactivating the wireless transmitter.

Another aspect of the present invention also includes a method for communicating an emergency. The method includes providing a mobile terminal having a wireless transmitter and a memory, activating the wireless transmitter in response to the emergency, and transmitting an emergency message from the wireless transmitter. The method also includes recording at least one of audio and imagery information that is indicative of the emergency in the memory of the mobile terminal, and transmitting the audio and imagery information from the wireless transmitter.

In additional aspects of the method, the method includes recording at least one of audio, photographic, video, and global positioning system information. The method may also include storing a plurality of codes into the memory of the mobile terminal, where the codes are capable of being entered to activate and deactivate the wireless transmitter to transmit the emergency message. The method could include deactivating the wireless transmitter by entering a first code, or entering an alarm code such that the wireless transmitter appears to be deactivated, although actually it remains in operation. The method may include recording the audio and video information while the wireless transmitter is incapable of transmitting the audio and imagery information, and subsequently deleting the audio and imagery information from the memory following the transmission of the audio and imagery information. Furthermore, the method may include transmitting the audio and imagery information in predetermined time increments different than that in which the audio and video information is recorded once the transmitter again becomes capable of transmitting the audio and imagery information. Additionally, the method may include activating the wireless transmitter by depressing a pair of buttons on the mobile terminal simultaneously for a predetermined amount of time. The method could include activating and deactivating the wireless transmitter upon receipt of an activation message by the wireless transmitter. The method could further include providing tactile feedback to a user indicating that the wireless transmitter has been activated.

The present invention therefore provides a mobile terminal, such as a mobile phone, that is able to transmit an emergency message to a service center, either in a discrete manner or non-discretely, depending upon the situation. The mobile terminal is also able to record a variety of information indicative of the emergency, such as audio, imagery, and positional information. Thus, the service center is able to obtain information without any additional user input, while also being able to determine the type and degree of emergency and the best manner of responding. The mobile terminal may begin recording once the transmitter is activated such that only the user is aware that the terminal is recording, which would be beneficial for situations where the user is unable to speak or provide additional input. Also, the mobile terminal is capable of recording the information even when the transmitter is incapable of transmitting the information due to a lack of a connection with the service center. This capability enables the mobile transmitter to store the information and then transmit the information once a signal is obtained, thus preserving the recorded information and allowing the service center to obtain valuable information indicative of the emergency.

Other embodiments provide still additional advantages. For example, by providing tactile feedback, such as a vibratory response, in accordance with one embodiment, only the user becomes aware that the transmitter has been activated. The mobile terminal of one embodiment also reduces the possibility of generating a false alarm by providing a pair of activation buttons that must be depressed simultaneously to activate the transmitter, where the buttons are located on opposite sides of the phone. Furthermore, the mobile terminal of one embodiment enables a user to program codes into the memory, which can be used to activate an alarm signal or deactivate the mobile terminal, thereby providing the user with even greater control.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

Figure 1:
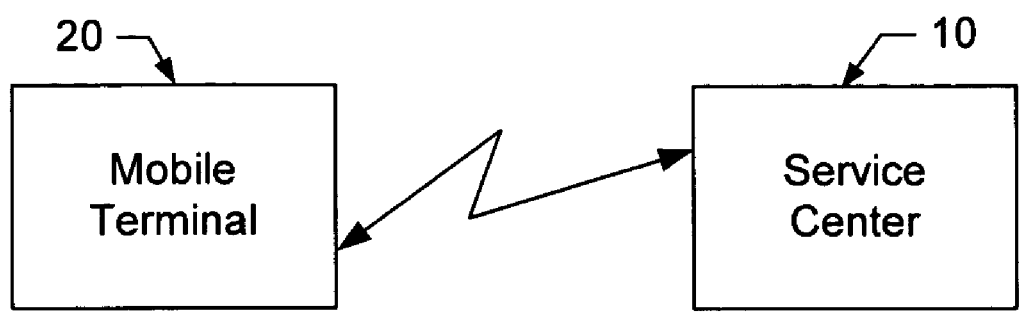
FIG. 1 is a schematic block diagram illustrating a mobile terminal in communication with a service center, according to one embodiment of the present invention.

Referring now to the drawings and, in particular to FIG. 1, there is shown a mobile terminal 20 in communication with a service center 10. One suitable mobile terminal 20 is illustrated by a block diagram of FIG. 2. It should be understood, that the terminal illustrated and hereinafter described is merely illustrative of one type of terminal that would benefit from the present invention and, therefore, should not be taken to limit the scope of the present invention. As such, "mobile terminal" is not meant to be limiting and could include other types of hand held and communication devices, such as mobile telephones, portable digital assistants (PDAs), pagers, and other types of voice and text communications systems, which can readily employ the present invention.

Similarly, the service center 10, as used herein and with which the mobile terminal 20 communicates, could be any suitable center capable of communicating with the mobile terminal 20 and monitoring an emergency situation based on transmissions from the mobile terminal. The service center 10 may then contact the appropriate emergency services if needed. For example, the service center 10 could be a 911 emergency response center. The service center 10 typically includes a receiver for receiving transmitted messages and information from the mobile terminal 20, as well as a transmitter for communicating with the mobile terminal. The receiver and transmitter generally communicate wireless with the mobile terminal 20 as described below. As will also be explained in further detail below, the service center 10 should also be capable of activating and deactivating the mobile terminal 20 from a remote location.

Figure 2:
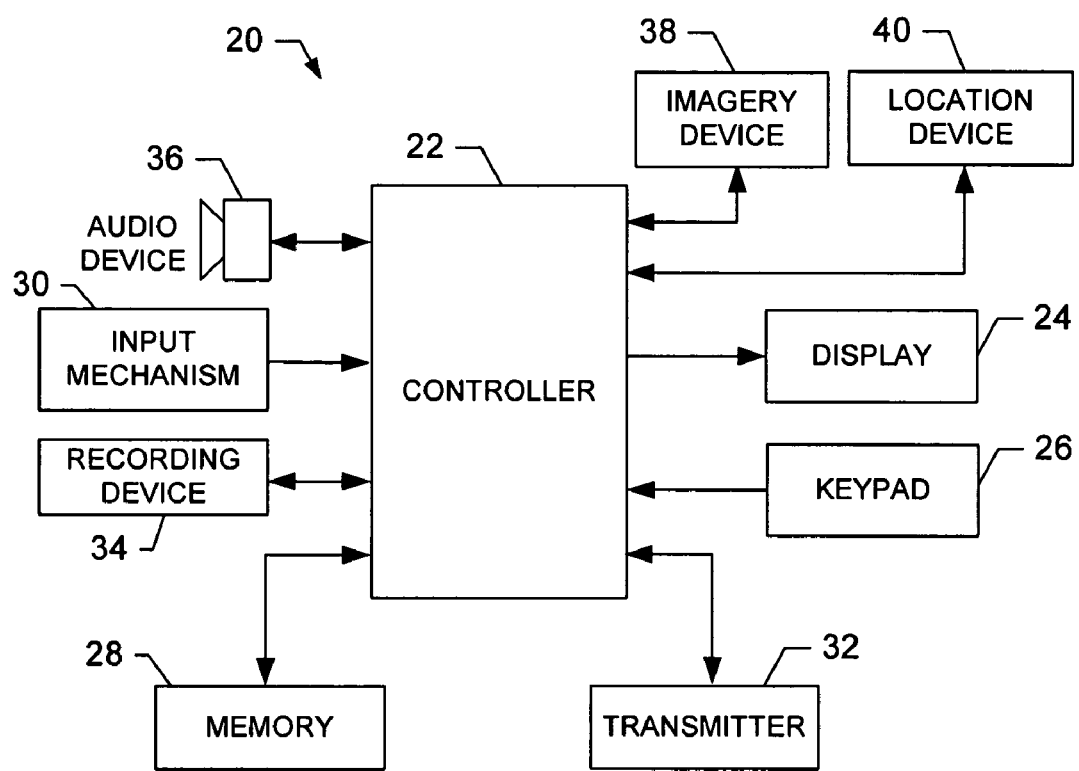
FIG. 2 is a schematic block diagram of a mobile terminal according to one embodiment of the present invention.

As shown in FIG. 2, the mobile terminal 20 includes a processor such as a controller 22. The controller includes the circuitry required for implementing the functions of the mobile terminal 20 in accordance with embodiments of the present invention, as explained in greater detail below. For example, the controller 22 may be comprised of a digital signal processor device, a microprocessor device, and/or various analog to digital converters, digital to analog converters, and other support circuits. The control and signal processing functions of the mobile terminal 20 are allocated between these devices according to their respective capabilities. The controller 22 may also include the functionally to operate one or more software applications. In addition to the controller 22, the mobile terminal 20 also includes a user interface that may include, for example, an audio device 36 having a microphone and conventional earphone or speaker capable of being driven by the controller to present various audible tones during operation of the terminal. The user interface may also include a display 24 and a user input interface, both of which are also coupled to the controller. The user input interface, which allows the terminal to receive data, can comprise any of a number of devices allowing the terminal to receive data, such as a keypad 26, an input mechanism 30 (discussed below), a touch display (not shown) or other input device. In embodiments including a keypad 26, the keypad can include one or more keys used for operating the mobile terminal.

The mobile terminal 20 also includes a transmitter 32 that is able to transmit messages and information when an appropriate signal is established between the transmitter and a receiver, such as with a cellular transmitter and receiver. Thus, the transmitter 32 could include an antenna for transmitting signals to, and for receiving signals from, a base site or base station. While the mobile terminal 20 will be described as having a cellular transmitter, the mobile terminal can have any other type of wireless transmitter.

The base station is a part of a cellular network that includes a mobile switching center (MSC), a message center, voice coder/decoders, data modems, and other units required to operate the network. The MSC is capable of routing calls and messages to and from the mobile terminal 20 when the mobile terminal is making and receiving messages and/or information. The MSC controls the forwarding of messages to and from the mobile station when the station is registered with the network, and also controls the forwarding of messages for the mobile terminal 20 to and from the service center 10. Such messages may include, for example, voice messages received by the MSC from users of Public Switched Telephone Network (PSTN) telephones, and may also include Short Message Service (SMS) messages, Multimedia Messaging Service (MMS) messages, and voice messages received by the MSC from the mobile terminal or other mobile terminals serviced by the network.

The mobile terminal 20 includes a memory 28 that may be volatile or non-volatile, as well as dedicated or assignable. The non-volatile memory, for example, may comprise embedded or removable multimedia memory cards (MMC's), Memory Sticks manufactured by Sony Corporation, EEPROM, flash memory, hard disk or the like. The memory can store any number of pieces of information, and data, used by the mobile terminal 20 to implement the functions of the terminal. For example, the memory 28 stores Personal Identification Numbers (PIN's) that may be used to activate and deactivate the transmitter 32 by entering the PIN's with the keypad 26 as described below.

The memory 20 is also able to store information recorded by a recording device 34. The recording device 34 could be any suitable device for capturing information and routing the information to the memory 28 to be stored temporarily or permanently. The information could be collected from audio 36, imagery 38, and location 40 devices and subsequently recorded by the recording device 34, or each of the devices may include a respective recording device that is able to record and store its respective information in the memory of the mobile terminal. In this regard, the audio device 36, as described above, typically includes a speaker and microphone that is able to send and receive audible tones. The memory 28 could, for example, be capable of storing at least five minutes of audio recorded by the recording device 34. The imagery device 38 could be any device capable of recording an image, such as a digital camera for capturing a photograph or video. Particularly, the memory 28 should be able to record at least twenty pictures. Furthermore, the location device 40 is generally a global positioning system (GPS) receiver but could be any suitable device for providing a location of the mobile terminal 20.

Figure 3:
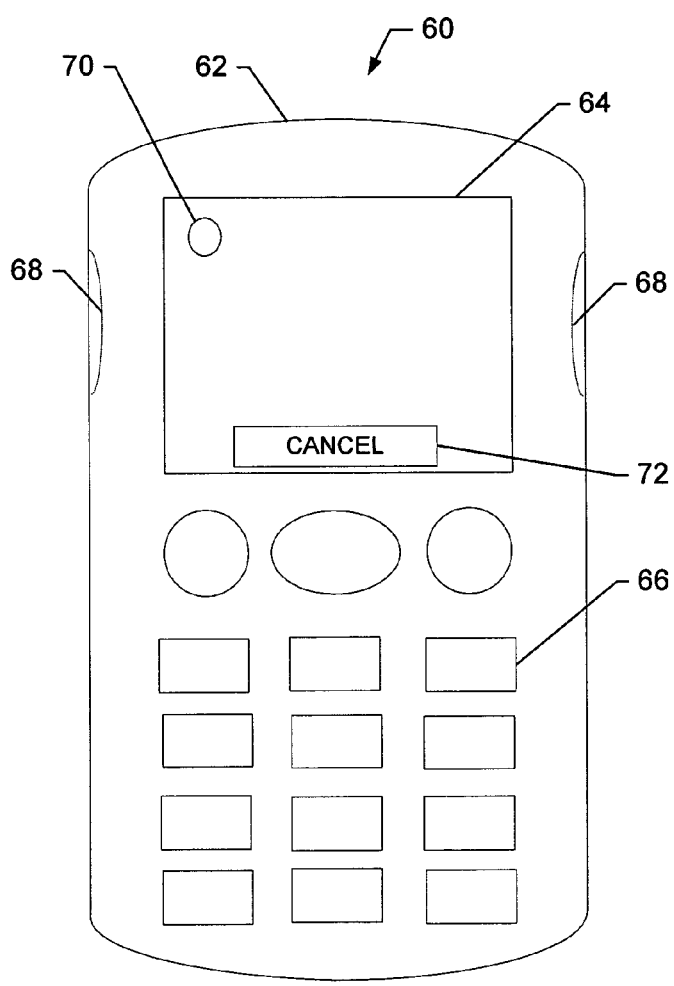
FIG. 3 is a plan view of a mobile phone capable of communicating an emergency message and information to a service center according to one embodiment of the present invention.
Figure 4:
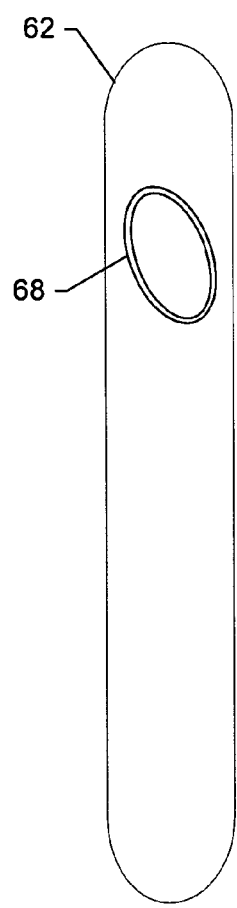
FIG. 4 is a side view of the mobile phone shown in FIG. 3.

As indicated above, and shown in FIGS. 3-4, the mobile terminal 10 of one embodiment of the present invention is capable of being embodied in a mobile phone 60 or other suitable portable package. The mobile phone 60 is fully functional to send and receive calls, check and receive voicemail, and perform any other function of a mobile or cellular phone as known to those skilled in the art. The mobile phone 60 includes a housing 62, as well as a display 64 and a keypad 66. The keypad 66 typically includes standard numeric keys and any number of additional soft keys that may have various functions (e.g., voicemail).

Figure 5:
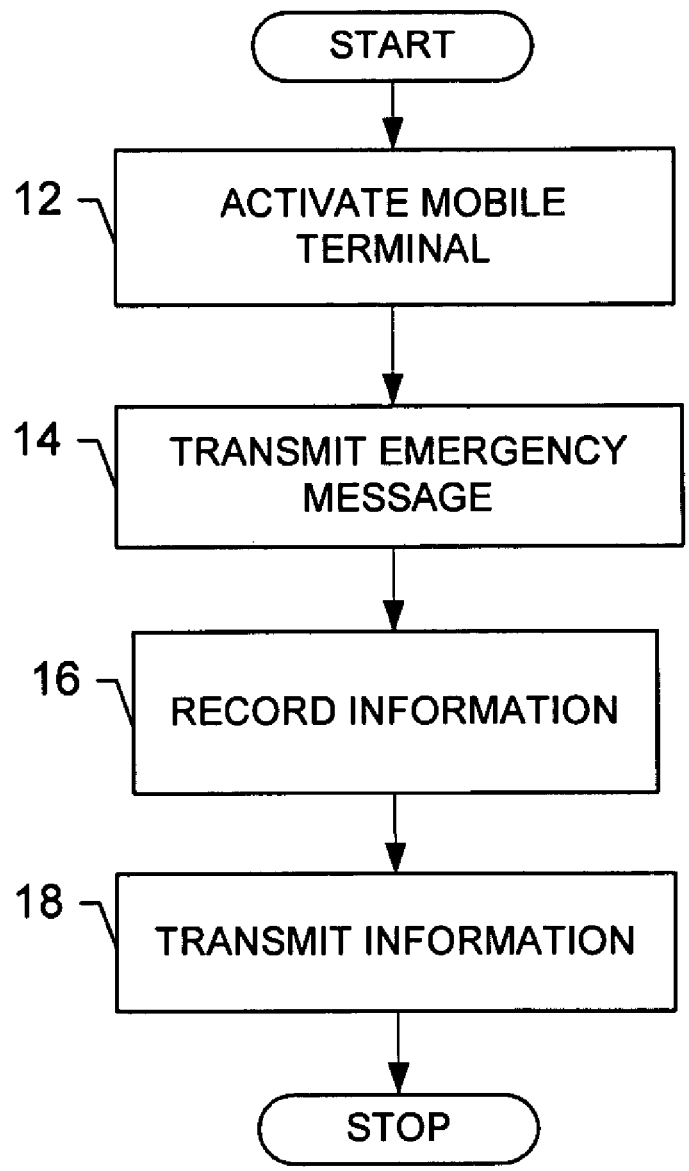
FIG. 5 is flowchart illustrating various steps of a method for communicating an emergency from a mobile terminal to a service center according to one embodiment of the present invention.

According to the present invention, the mobile terminal 20 includes an input mechanism 30 for receiving user input indicative of an emergency (block 12 of FIG. 5). In the illustrated embodiment, the input mechanism 30 comprises activation buttons 68, located on opposed lateral sides of the mobile phone 60 to initiate the process of communicating an emergency. The activation buttons 68 of this embodiment are recessed within the housing 62 and must be depressed simultaneously for a predetermined period of time before the mobile phone 60 is activated. Even when the mobile phone 60 is turned off, the user is able to activate the mobile phone by pressing and holding the activation buttons 68 for a predetermined period of time (e.g., five seconds). Although the activation buttons 68 are shown as being recessed and on opposed lateral sides of the housing 62, it is understood that the activation buttons need not be recessed and could be any number of buttons, including a single button, and located at any desired location on the housing of the mobile phone 60. By including two buttons on the side of the mobile terminal, however, the possibility of inadvertently transmitting an emergency signal is significantly reduced, while still permitting a user to readily actuate both buttons, even in an emergency.

Upon receiving user input indicative of an emergency via the input mechanism 30, the mobile terminal 20 and, more particularly, the wireless transmitter 32 is driven to transmit an emergency message (block 14 of FIG. 5) to a service center 10. As used throughout, activating the mobile terminal is not meant to be limiting, and includes activating not only the mobile terminal, but also all elements associated with the mobile terminal (e.g., transmitter) such that the mobile terminal may transmit an emergency message and/or information to a service center.

Figure 6:
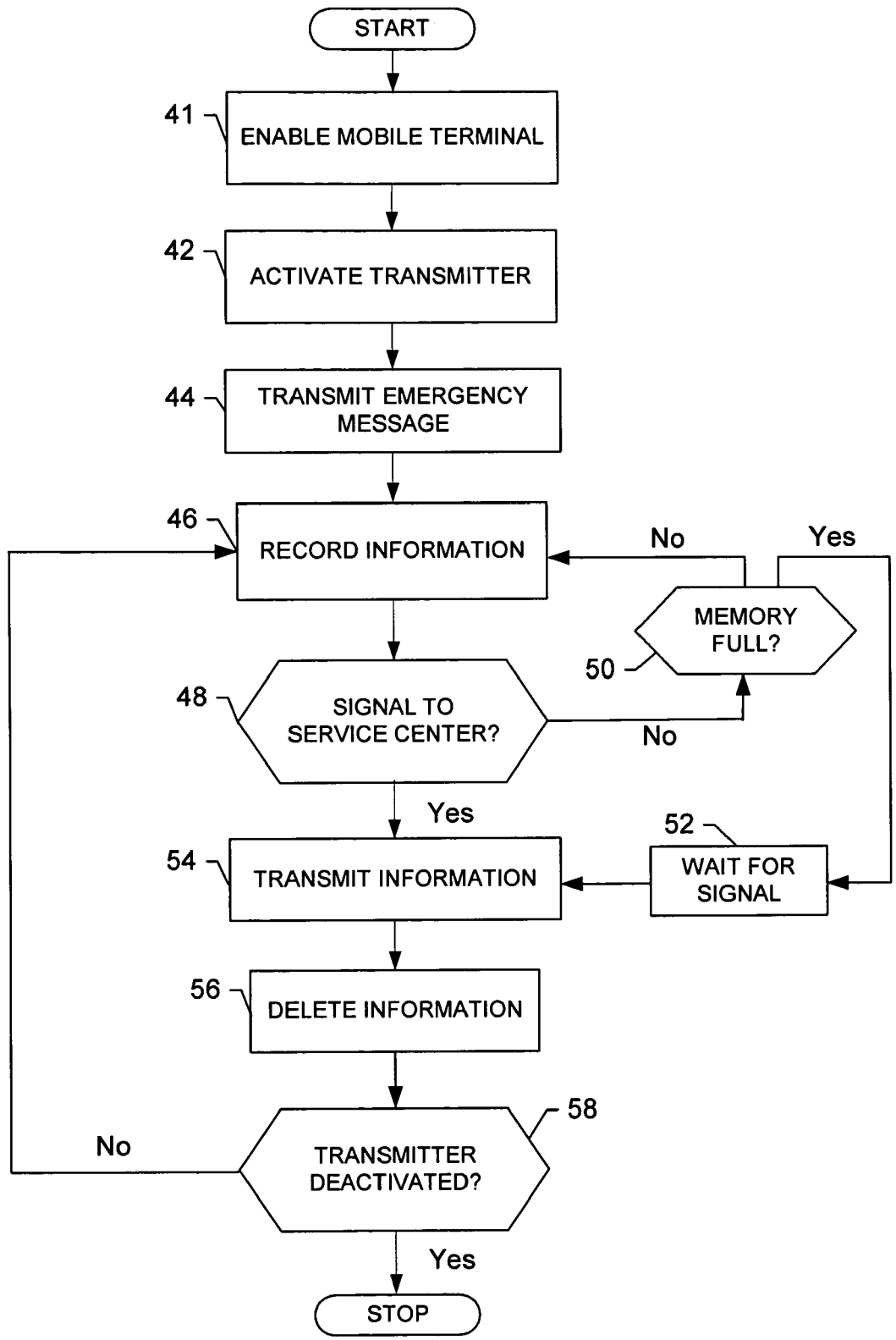
FIG. 6 is flowchart illustrating various aspects of the method of communicating an emergency illustrated in FIG. 5 according to one embodiment of the present invention.

FIG. 6 illustrates various aspects of communicating an emergency message and information to a service center 10 using the mobile terminal 20 described previously. Generally, the mobile terminal 20 must first be enabled (block 41 of FIG. 6) before the input mechanism 30 is operational. The mobile terminal 20 could be enabled by accessing a security menu item, where the user must enter a security PIN prior to accessing the security menu item. Following the activation of the transmitter 32 (block 42 of FIG. 6) via the input mechanism 30, an emergency message is generated and transmitted to a service center 10 (block 44 of FIG. 6). If there is no signal present, the emergency message is queued, typically within memory 28, and transmitted once a signal is received. According to one embodiment, activating the mobile terminal 20 to communicate an emergency message causes all keys except for the numeric keypad 26 to become disabled. Moreover, in the mobile phone 60 embodiment, the menu 74 having a cancel option is also not disabled by actuation of the input mechanism 30.

While activated, the mobile terminal 20 is capable of recording information (block 16 of FIG. 5) indicative of the emergency, such as audio, imagery, and location information. The mobile terminal 20 then transmits the recorded information (block 18 of FIG. 5) to the service center 10, which provides the information to the service center without any additional input from the user.

The emergency message typically includes the time of activation of the mobile terminal 20, as well as recorded information, such as the location of the phone (if the mobile terminal supports this feature), and imagery information (if the mobile terminal supports this feature). Therefore, immediately following user input to activate the mobile terminal 20, the recording device 34 begins to record audio information, which could include the user's voice, as well as any other audible sounds that are capable of being received by the audio device 36. Further, if the mobile terminal includes an imagery device 38, such as a digital camera, a photograph or video will be taken without auditory feedback. Similarly, if the mobile terminal 20 has a location device 40, such as a GPS receiver, that may provide a location of the mobile terminal, this may also be included with the emergency message. As such, if the emergency message only includes audio information, the emergency message could be a SMS message, or if imagery or location information in addition to, or in place of, the audio information is included, the message could be a MMS message. Therefore, it is understood that the emergency message could be any message capable of being transmitted to the service center 10 and containing sufficient information to notify the service center that a potential emergency is at hand. As such, the emergency message could include any number and combination of textual, audio, imagery, or location information that may be transmitted to the service center 10.

Once the mobile phone 60 is activated, the user receives tactile feedback, such as a vibratory response, or other discrete notification that only the user is aware of. Also, an icon 70 will be displayed on the display 64 indicating that the mobile phone 60 has been activated, in addition to a menu 72 that gives the user the option to cancel the activation. The user could press a soft key on the keypad 66 that corresponds to the menu 72 or other PIN (as discussed below) that may deactivate the mobile phone 60. Therefore, other than the user, and those able to read the display 64, there is no visible feedback. Providing no visible feedback at a distance from the mobile phone 60 allows the user to discretely depress the activation buttons 68 and receive notification that the mobile phone has been activated to transmit the emergency without alerting a potential abductor that a call for help has been made. It is understood that there could be instances where the user wishes to provide a non-discrete emergency signal, such as an audible or visual alarm, that alerts those around the user that an emergency is at hand. The user may believe that help is immediately at hand, or the user may be alone and hoping that someone nearby will be alerted by the alarm.

Following the transmission of the emergency message, the recording device 34 begins to record additional information indicative of the emergency. Thus, the audio 36, imagery 38, and location 40 devices may provide additional information relating to the initial emergency message in predetermined time increments so that the service center 10 is able to monitor the emergency situation without additional user input. Specifically, the recording device 34 records audio information in predetermined time increments (e.g., 15 seconds) into a buffer until the allowed memory 28 is full. Also, imagery and/or location information is recorded in predetermined time increments (e.g., 15 seconds) and may also include additional information such as the time.

As shown in block 48 of FIG. 6, if a signal to the service center 10 is present, the transmitter 32 will transmit the recorded information obtained in block 46 of FIG. 6 to the service center. If there is no signal to transmit the recorded information, an operation is performed to determine if the memory 28 is full (block 50 of FIG. 6). If the memory 28 is not full, additional information is recorded until the memory is full. However, if the memory 28 is full, the recorded information will be queued until a signal is obtained (block 52 of FIG. 6). Once a signal is received, the recorded information is transmitted to the service center 10 (block 54 of FIG. 6). Generally, the audio information is sent in an alternating fashion with the imagery, location, and/or time information. Thus, the audio information is not generally sent at the same time as the imagery, location and/or time information, although it is understood that all of the recorded information could be transmitted to the service center 10 simultaneously.

The recorded information is typically deleted once the information is transmitted to the service center 10 (block 56 of FIG. 6) to provide additional space in the memory 28 for updated information. If the transmitter 32 is still activated, additional information will be recorded, as shown in block 58 of FIG. 6. If a signal is present long enough to transmit the recorded information, the audio information, as well as the imagery, location, and/or time information, are transmitted to the service center 10 in predetermined time increments (e.g., 30 seconds) in an alternating fashion as described above. Providing a limited amount of time between transmitting the information reduces the chance of falling substantially behind the current time. If the signal is lost, the mobile terminal 20 reverts to recording and storing additional information until the memory 28 is full. As such, in instances in which the transmitter 32 is presently unavailable, the information transmitted to the service center 10 may be subsequently transmitted in a different time increment, i.e., after the transmitter becomes available, than when the information is being recorded while the transmitter 32 is off line. However, it is understood that these particular transmission and recording time increments could be any predetermined time increments and may be the same time increment in additional embodiments of the present invention.

As mentioned previously, the mobile phone 60 may be deactivated, such as by choosing the option on the menu 72 to cancel, as well as entering a particular PIN that is stored in the memory 28. As used herein, the PIN could be a code containing any number and combination of alphanumeric digits that may be entered into the keypad 26 by the user. In one embodiment of the present invention, a user would typically store at least two PIN's in the memory 28 (e.g., Subscriber Identity Module (SIM) card), where one PIN is used to deactivate the transmitter, and the second PIN is used to activate an alarm message. The PIN's may be unique to a particular user and may be updated at any time. An additional option for the user to deactivate the mobile terminal 20 is to physically disassemble the mobile terminal and remove the battery, or destroy the mobile terminal. However, if a signal is present when the transmitter 32 was initially activated, there will typically still be time to transmit the emergency message to the service center 10. Also, even if the mobile terminal 20 is destroyed, the memory 28 will retain any stored emergency messages or recorded information.

If the user enters the correct deactivation PIN, the user typically receives tactile feedback (e.g., a vibratory response) and the display 24 shows a message indicating that the transmitter 32 has been deactivated, although any method of notification could be used, whether it be tactile, visual, or audio. The user may then be prompted to determine if the PIN was entered because of an unintentional activation or for a need to use the phone. If the transmitter 32 was unintentionally activated, a message is transmitted to the service center 10 indicating that the activation was accidental or unintentional. If the mobile terminal 20 was initially unable to obtain a signal, no emergency message or recorded information will be transmitted to the service center 10 even after the transmitter 32 returns to service. Similarly, if the user wishes to use the phone, a message may be transmitted to the service center 10 indicating that the user wishes to use the phone. If the mobile terminal 20 was unable to transmit the request to use the phone, the request is queued, typically in memory 28, and sent as soon as a signal is received.

The mobile terminal 20 of one embodiment may also permit an alarm PIN to be entered which causes the mobile terminal 20 to appear to be deactivated from transmitting an emergency message and/or recorded information. Typically, when the alarm PIN is entered on the keypad 26, the user receives a tactile response, such as a vibration, and a message is displayed on the display 24 indicating that the mobile terminal has been deactivated. In this embodiment, however, the mobile terminal 20 is still activated and is fully capable of transmitting an emergency message and/or recorded information. The user may be prompted to determine if the PIN was entered because of an unintentional activation or because of a need to use the phone. A message is transmitted to the service center 10 indicating that the alarm PIN was intentionally entered and that an emergency still exists. An alarm PIN may be necessary, for example, in instances where the user is being coerced to deactivate the mobile terminal 20, such that the user desires to transmit the emergency message while giving an attacker the impression that the mobile terminal is deactivated.

In additional embodiments of the present invention, the service center 10 is able to activate and deactivate the mobile terminal 20. For example, the service center 10 could send a message (e.g., SMS message) to the mobile terminal 20 to deactivate the mobile terminal from transmitting any messages and/or recorded information. This might be desirable in circumstances where it is apparent that the user has mistakenly activated the transmitter 32, or that the service center 10 wants the mobile terminal 20 to receive a call. The service center 10 could also send a message to the mobile terminal 20 to enable a speakerphone (if available) in the mobile terminal or the standard internal speaker in the audio device 36, in addition to requesting the user to maximize the volume on the audio device or to deactivate the mobile terminal and call the service center.

The service center 10 is also capable of activating the mobile terminal 20, such as in situations where the service center is aware of an emergency involving the user. This feature would be enabled in the mobile terminal 20 by default, but the user is able to disable this option in their mobile terminal 20 if desired. Also, enabling this particular feature is distinct from the situation where the user enables the mobile terminal 20 for activating the transmitter 32 for transmitting emergency and/or recorded information.

The present invention therefore provides a mobile terminal 20, such as a mobile phone 60, that is able to transmit an emergency message to a service center 10, either in a discrete manner or non-discretely depending upon the situation. The mobile terminal 20 is also able to record a variety of information indicative of the emergency, such as audio, imagery, and positional information. Thus, the service center 10 is able to obtain information without any additional user input, while also being able to determine the type and degree of emergency and the best manner of responding. The mobile terminal 20 may begin recording once the transmitter 32 is activated such that only the user is aware that the terminal is recording, which would be beneficial for situations where the user is unable to speak or provide additional input. Also, the mobile terminal 20 is capable of recording the information even when the transmitter 32 is incapable of transmitting the information due to a lack of a connection with the service center 10. This capability enables the mobile terminal 20 to store the information and then transmit the information once a signal is obtained, thus preserving the recorded information and allowing the service center 10 to obtain valuable information indicative of the emergency.

Other embodiments provide still additional advantages. For example, by providing tactile feedback, such as a vibratory response in accordance with one embodiment, only the user becomes aware that the transmitter 32 has been activated. The mobile terminal 20 of one embodiment also reduces the possibility of generating a false alarm by providing a pair of activation buttons 68 that must be depressed simultaneously to activate the transmitter 32, where the buttons are located on opposite sides of the phone. Furthermore, the mobile terminal 20 of one embodiment enables a user to program codes into the memory 28, which can be used to activate an alarm signal or deactivate the mobile terminal, thereby providing the user with even greater control.

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A mobile terminal for communicating an emergency, comprising:

an input mechanism capable of receiving user input indicative of an emergency;

a wireless transmitter capable of independently transmitting an emergency message in response to the user input;

a recording device capable of independently recording at least two of audio, location, time, or imagery information indicative of the emergency and in response to the user input, the audio, location, time, or imagery information capable of being transmitted by the wireless transmitter in a plurality of predetermined increments of time and in an alternating fashion such that the at least two of the audio, location, time, or imagery information are capable of being transmitted independently from each other; and a memory capable of storing the at least two of audio, location, time, or imagery information.

2. The mobile terminal according to claim 1, wherein the recording device is capable of recording at least one of audio, photographic, video, and global positioning system information.

3. The mobile terminal according to claim 1, wherein the input mechanism comprises two buttons positioned on opposed lateral sides of the mobile terminal.

4. The mobile terminal according to claim 1, wherein the memory is further capable of storing a plurality of codes, the plurality of codes capable of being entered to at least one of activate and deactivate the wireless transmitter to transmit the emergency message.

5. The mobile terminal according to claim 4, wherein the plurality of codes comprises a first code capable of deactivating the wireless transmitter 6. The mobile terminal according to claim 4, wherein the plurality of codes comprises a second code capable of activating the wireless transmitter to transmit an alarm message.

7. The mobile terminal according to claim 1, wherein the recording device is capable of recording the audio and imagery information in increments of time while the transmitter is incapable of transmitting the audio and imagery information.

8. The mobile terminal according to claim 7, wherein the wireless transmitter is capable of transmitting the audio and imagery information in different increments of time than that in which the audio and imagery information is recorded once the wireless transmitter again becomes capable of transmitting the audio and imagery information.

9. The mobile terminal according to claim 1, further comprising a display capable of displaying an icon indicating that the wireless transmitter has been activated.

10. The mobile terminal according to claim 1, further comprising a tactile feedback mechanism capable of indicating to a user that the wireless transmitter has been activated to transmit the emergency message.

11. The mobile terminal according to claim 1, wherein the emergency message comprises at least one of a time of activation, a location of the mobile terminal, and imagery indicative of the emergency.

12. A mobile terminal for communicating an emergency, comprising:
   an input mechanism capable of receiving user input indicative of an emergency;
   a wireless transmitter;
   a recording device capable of recording at least at least two of audio, location, time, or imagery information indicative of the emergency and in response to the user input, the at least two of the audio, location, time, or imagery information capable of being transmitted by the wireless transmitter in a predetermined time increment that is different than a predetermined time increment that the at least two of the audio, location, time, or imagery information is recorded; and
   a memory capable of storing the at least two of audio, location, time, or imagery information and storing a plurality of codes, the plurality of codes capable of being entered by the user to at least one of activate and deactivate the wireless transmitter to transmit at least at least two of audio, location, time, or information.

13. The mobile terminal according to claim 12, wherein the recording device is capable of recording at least one of audio, photographic, video, and global positioning system information.

14. The mobile terminal according to claim 12, wherein the input mechanism comprises two buttons positioned on opposed lateral sides of the mobile terminal.

15. The mobile terminal according to claim 12, wherein the plurality of codes comprises a first code capable of deactivating the wireless transmitter.

16. The mobile terminal according to claim 12, wherein the plurality of codes comprises a second code capable of activating the wireless transmitter to transmit an alarm message.

17. The mobile terminal according to claim 12, wherein the wireless transmitter is capable of transmitting the stored audio and imagery information in a plurality of predetermined increments of time.

18. A system for communicating an emergency, comprising:
   a mobile terminal comprising:
      an input mechanism capable of receiving user input indicative of an emergency;
      a wireless transmitter capable of independently transmitting an emergency message in response to the user input;
      a recording device capable of independently recording at least two of audio, location, time, or imagery information indicative of the emergency and in response to the user input, the audio, location, time, or imagery information capable of being transmitted by the wireless transmitter in a plurality of predetermined increments of time and in an alternating fashion such that the at least two of the audio, location, time, or imagery information is capable of being transmitted independently from each other; and
      a memory capable of storing the at least two of audio, location, time, or imagery information; and
   a service center comprising a wireless receiver capable of communicating with the wireless transmitter of the mobile terminal.

19. The system according to claim 18, wherein the recording device is capable of recording at least one of audio, photographic, video, and global positioning system information.

20. The system according to claim 18, wherein the input mechanism comprises two buttons positioned on opposed lateral sides of the mobile terminal.

21. The system according to claim 18, wherein the memory is further capable of storing a plurality of codes, the plurality of codes capable of being entered to at least one of activate and deactivate the wireless transmitter to transmit the emergency message.

22. The system according to claim 21, wherein the plurality of codes comprises a first code capable of deactivating the wireless transmitter.

23. The system according to claim 21, wherein the plurality of codes comprises a second code capable of activating the wireless transmitter to transmit an alarm message.

24. The system according to claim 18, wherein the recording device is capable of recording the audio and imagery information in increments of time while the transmitter is incapable of transmitting the audio and imagery information.

25. The system according to claim 24, wherein the wireless transmitter is capable of transmitting the audio and imagery information in different increments of time than that in which the audio and imagery information is recorded once the wireless transmitter again becomes capable of transmitting the audio and imagery information.

26. The system according to claim 18, wherein the mobile terminal further comprises a display capable of displaying an icon indicating that the wireless transmitter has been activated.

27. The system according to claim 18, wherein the mobile terminal further comprises a tactile feedback mechanism capable of indicating to a user that the wireless transmitter has been activated to transmit the emergency message.

28. The system according to claim 18, wherein the emergency message comprises at least one of a time of activation, a location of the mobile terminal, and a photograph indicative of the emergency.

29. The system according to claim 18, wherein the service center is capable of activating and deactivating the wireless transmitter.

30. A method for communicating an emergency, comprising:
  activating a wireless transmitter of a mobile terminal in response to the emergency;
  independently transmitting an emergency message from the wireless transmitter;
  independently recording at least two of audio, location, time, or imagery information indicative of the emergency in a memory of the mobile terminal; and
  transmitting the audio, location, time, or information from the wireless transmitter in a plurality of predetermined increments of time and in an alternating fashion such that the at least two of the audio, location, time, or imagery information is capable of being transmitted independently from each other.

31. The method according to claim 30, wherein recording includes recording at least one of audio, photographic, video, and global positioning system information.

32. The method according to claim 30, further comprising storing a plurality of codes into the memory of the mobile terminal, the codes capable of being entered to at least one of activate and deactivate the wireless transmitter to transmit the emergency message.

33. The method according to claim 32, further comprising deactivating the wireless transmitter by entering a first code.

34. The method according to claim 32, further comprising entering an alarm code such that the wireless transmitter appears to be deactivated although the wireless transmitter continues to operate.

35. The method according to claim 30, wherein recording comprises recording the audio and imagery information while the wireless transmitter is incapable of transmitting the audio and imagery information.

36. The method according to claim 35, wherein transmitting comprises transmitting the audio and imagery information in predetermined time increments different than that that in which the audio and imagery information is recorded once the wireless transmitter again becomes capable of transmitting the audio and imagery information.

37. The method according to claim 30, further comprising deleting the audio and imagery information from the memory following transmitting of the audio and imagery information.

38. The method according to claim 30, wherein activating comprises activating the wireless transmitter by depressing a pair of buttons on the mobile terminal simultaneously for a predetermined amount of time.

39. The method according to claim 30, further comprising deactivating the wireless transmitter upon receipt of a deactivation message by the wireless transmitter.

40. The method according to claim 30, wherein activating comprises activating the wireless transmitter by upon receipt of an activation message by the wireless transmitter.

41. The method according to claim 30, further comprising providing tactile feedback to a user indicating that the wireless transmitter has been activated.

42. An apparatus comprising:
  a processor configured to activate a wireless transmitter of a mobile terminal in response to the emergency, the processor also configured to direct transmission of an emergency message from the wireless transmitter, the processor further configured to independently record at least two of audio, location, time, or imagery information indicative of the emergency in a memory of the mobile terminal, and the processor further configured to transmit the audio, location, time, or imagery information from the wireless transmitter in a plurality of predetermined increments of time and in an alternating fashion such that the at least two of the audio, location, time, or imagery information is capable of being transmitted independently from each other.

43. A computer readable medium having stored thereon a plurality of instructions, said plurality of instructions when executed by a processor, cause said processor to:
  activate a wireless transmitter of a mobile terminal in response to the emergency;
  independently transmit an emergency message from the wireless transmitter;
  independently record at least two of audio, location, time, or imagery information indicative of the emergency in a memory of the mobile terminal; and
  transmit the audio, location, time, or imagery information from the wireless transmitter in a plurality of predetermined increments of time and in an alternating fashion such that the at least two of the audio, location, time, or imagery information is capable of being transmitted independently from each other.

* * * * *